United States Patent [19]

Agrawal et al.

[11] Patent Number: 4,911,385
[45] Date of Patent: Mar. 27, 1990

[54] ATTITUDE POINTING ERROR CORRECTION SYSTEM AND METHOD FOR GEOSYNCHRONOUS SATELLITES

[76] Inventors: Brij N. Agrawal, 9 Thorburn Pl., Gaithersburg, Md. 20878; Pierre J. Madon, 1033 - 22nd St., N.W., Washington, D.C. 20037

[21] Appl. No.: 44,327

[22] Filed: Apr. 30, 1987

[51] Int. Cl.⁴ .............................................. B64G 1/28
[52] U.S. Cl. ...................................... 244/165; 244/164
[58] Field of Search ............... 244/164, 165, 169, 171; 364/434

[56] References Cited

U.S. PATENT DOCUMENTS

| | | | |
|---|---|---|---|
| 3,591,108 | 7/1971 | Perkel et al. | |
| 3,813,067 | 5/1974 | Mork | 244/165 |
| 3,834,653 | 9/1974 | Perkel | |
| 4,023,752 | 5/1977 | Pistiner et al. | 244/169 |
| 4,062,509 | 12/1977 | Muhlfelder et al. | |
| 4,071,211 | 1/1978 | Muhlfelder et al. | |
| 4,084,772 | 4/1978 | Muhlfelder | 244/165 |
| 4,136,844 | 1/1979 | Maudol | 244/165 |
| 4,275,861 | 6/1981 | Hubert | 244/165 |
| 4,288,051 | 9/1981 | Göschel | 244/164 |
| 4,325,124 | 4/1982 | Renner | 244/164 |
| 4,418,306 | 11/1983 | Samsel | 244/171 |
| 4,437,047 | 3/1984 | Smay | 244/164 |
| 4,573,651 | 3/1986 | Stanton | 244/165 |
| 4,728,062 | 3/1988 | Hubert | 244/165 |
| 4,776,540 | 10/1988 | Westerlund | 244/164 |

Primary Examiner—Galen L. Barefoot
Attorney, Agent, or Firm—Wallace G. Walter; Alfred A. Stadnicki

[57] ABSTRACT

A system and method for attitude control in a geosynchronous satellite to compensate for roll and yaw pointing errors consequent to orbit inclination variation from the nominal equatorial orbit plane provides for an inertially fixed momentum vector coupled to the satellite through a gimbal system providing a one and preferably two degree-of-freedom relationship with the momentum vector. In a two degree-of-freedom embodiment, the momentum vector is established by spinning the satellite about an axis or providing an independent momentum wheel with the gimbal axes provided along the roll and yaw axes. Gimbal torquers torque the satellite about the inertially fixed momentum vector in a time-varying manner to effect correction of the roll and yaw pointing errors. Roll and yaw pointing errors consequent to orbit inclination drift from the nominal equatorial orbit are corrected in a fuel-efficient manner to extend the operating life of the satellite.

47 Claims, 5 Drawing Sheets

ATTITUDE POINTING ERROR CORRECTION SYSTEM AND METHOD FOR GEOSYNCHRONOUS SATELLITES

BACKGROUND OF THE INVENTION

The present invention relates to attitude control for geosynchronous satellites and, more particularly, to attitude control systems and methods for compensating roll and yaw pointing errors that occur as a consequence of orbit deviation from the nominal equatorial orbit plane.

Communications and navigation satellites are typically placed in a circular orbit, known as a geosynchronous or geostationary orbit, having a period of revolution equal to that of the earth to provide synchronized rotational velocities. Ideally, the satellite is placed in an orbit plane coincident with the equatorial plane of the earth so that the antenna or antennas of the satellite can be pointed to desired terrestrial locations. In general, geosynchronous satellites are momentum stabilized, either by spinning the satellite itself or providing a momentum wheel, with the spin axis maintained normal the desired equatorial orbit plane and the global beam boresight aligned normal to the spin axis. In this ideal situation, the global beam boresight points to a subsatellite area that remains fixed as the satellite and earth rotate in synchronism.

Several factors induce orbital drift by which the satellite orbit tilts relative to the nominal equatorial orbit plane. This orbit tilt, which accumulates with time, creates roll and yaw pointing errors. More specifically, the gravitational effect of the sun and the moon on the satellite and the variations in the earth's gravitational field caused by the non-spherical shape of the earth introduce orbit perturbing effects which cause the plane of the satellite's orbit to tilt with respect the desired equatorial plane. The net effect of these orbit-disturbing influences is to cause the inclination of the satellite orbit to drift slowly at a rate of between 0.75° and 0.95° per year.

Figures 1, 2:
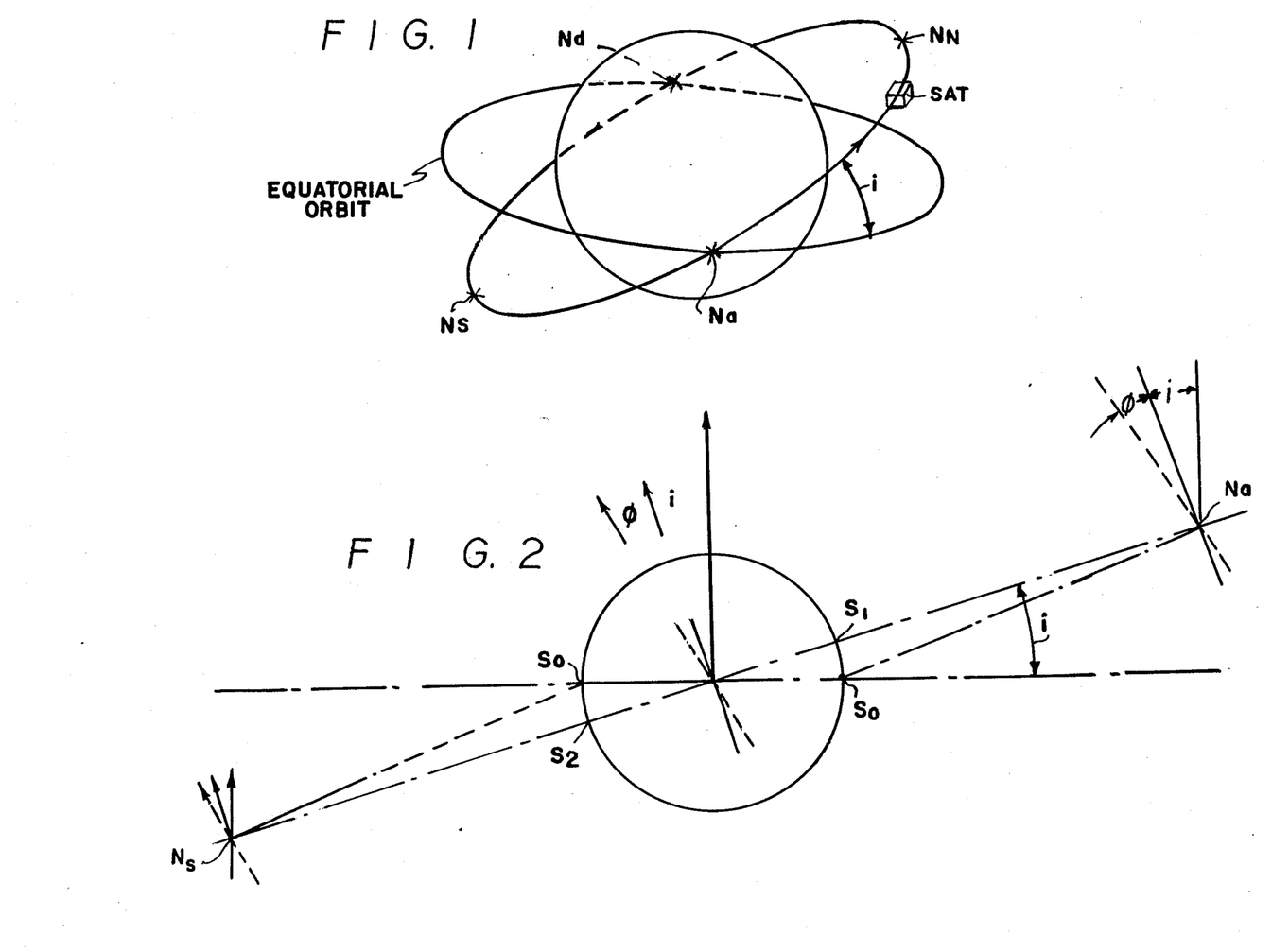
FIG. 1 is a perspective view, in schematic form. of an equatorial orbit plane and an inclined orbit plane about the earth and illustrating various orbit nodes and antinodes.
FIG. 2 is a two-dimensional schematic view of the inclined and equatorial orbits of FIG. 1.

As the orbit inclination increases, the terrestrial illumination pattern of the satellite's antenna or antennas drifts from the desired aiming area as a consequence of the roll and yaw pointing errors. For example and as shown in FIGS. 1 and 2, a satellite 'S' moving in an earth orbit in the direction indicated at an angle i to the equatorial orbit plane will intersect the equatorial plane at an ascending node $N_a$ where the satellite passes from the southern hemisphere to the northern hemisphere and again intersect the equatorial orbit plane at the descending node $N_d$ when moving from the northern hemisphere to the southern hemisphere. As the satellite progresses from its ascending node $N_a$ to its maximum northern latitude, it passes through its north anti-node $N_n$, and, conversely, as the satellite progresses from its descending node $N_d$ to its maximum southern latitude, it passes through its south anti-node $N_s$.

Figure 3A:
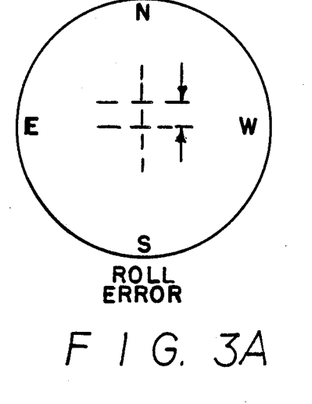
FIG. 3A is a view of the terrestrial surface and the effect of roll axis pointing error on a terrestrial antenna illumination pattern.
Figure 3B:
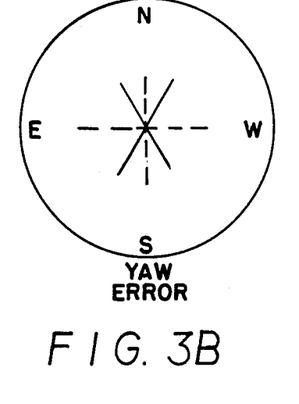
FIG. 3B is a view of the terrestrial surface and the effect of yaw axis pointing error on a terrestrial antenna illumination pattern.

As a consequence of the inclination angle i between the actual satellite orbit and the nominal equatorial plane, the antenna illumination pattern that the satellite projects onto the surface of the earth will suffer from the adverse effects of sinusoidal variations of the north-south and rotational motions, corresponding to the spacecraft roll error and yaw errors, respectively. For example, in the case where the satellite spin axis is normal to the inclined orbit plane, as shown in FIG. 2, as the satellite progresses through its ascending node $N_a$, the roll error (FIG. 3A) of the terrestrial illumination pattern is zero while the yaw error (FIG. 3)) is at a maxima. As the satellite progresses towards its north anti-node $N_n$, the roll error increases until attaining a maxima at the north anti-node $N_n$ while the yaw error reduces to zero. As shown in FIG. 2, when the satellite is at its north anti-node $N_n$, the global beam boresight will be directed to point $S_1$ on the earth's surface. Conversely, as the satellite progresses from the north anti-node $N_n$, the roll error diminishes to zero and the yaw error once again increase to a maxima at the descending node $N_d$. When the satellite attains its south anti-node $N_s$, as shown in FIG. 2, the global beam boresight will be directed to point $S_2$ on the earth's surface.

The roll and yaw errors introduced by orbit inclination depend on the orientation of the spacecraft spin axis. In the general case where the spin axis is tilted by an angle $\alpha$ from the axis normal to the equatorial plan, the roll error will be $(1.178i - \alpha) \sin nt$ and the yaw error will by $-\alpha \cos nt$, where i is the orbit inclination, n is the orbit angular rate, and t = time with t=0 at the ascending node. As can be appreciated roll and yaw error are functionally related and one can be determined as a function of the other.

One technique proposed for the reduction of the roll pointing error is to intentionally tilt the vehicle spin axis relative to the equatorial orbit normal. As shown in FIG. 2, the satellite spin axis (dotted line illustration) is tilted at an angle $\theta$ to effectively reposition the global beam boresight of the satellite to the area $S_o$ obtained with the satellite in the equatorial orbit. While the roll error will be effectively zero, the yaw error will be increased by the contribution of the spin axis tilt angle $\theta$ and is represented by $-(i + \theta) \cos nt$. Where circularly polarized communications or narrow spot beams are utilized, tee increased yaw error is unacceptable.

Figure 3C:
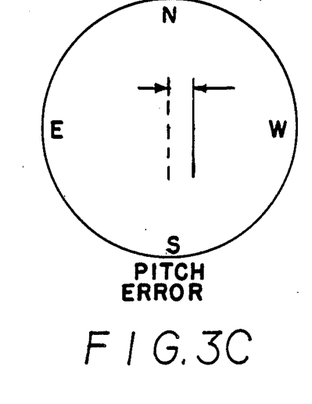
FIG. 3C is a view of the terrestrial surface and the effect of pitch axis pointing error on a terrestrial antenna illumination pattern.

In conventional satellite systems, thrusters are used to periodically correct the inclination of the orbit by expending fuel, this use being termed north-south station-keeping. In particular and for a ten-year mission, this station-keeping function can require as much as 20% of the total initial mass of the satellite with a substantial fraction of the propellant, approximately 90%, used for orbit inclination correction and the remainder used for other in-orbit maneuvers including attitude error correction (FIG. 3C). In general, the operating life of a geosynchronous satellite is limited by the station-keeping fuel requirements and operating life can be extended by terminating north-south station-keeping. However, cessation of north-south station-keeping introduces attitude errors which must be corrected.

In recognition of the substantial on-board fuel requirements for inclination correction maneuvers, various attitude control systems have been proposed to correct attitude errors introduced by orbit inclination. For example, U.S. Pat. No. 4,084,772 to Muhlfelder presents a system for roll/yaw vehicle steering in which the vehicle is stabilized by a momentum wheel in which angular velocity of the wheel is varied in a sinusoidal manner during the course of the orbit revolution to vary the associated vehicle momentum and effect a sinusoidal variation in the roll attitude of the vehicle with each orbit revolution. In U.S. Pat. No. 4,062,509 to Muhlfelder et al., a magnetic torquing system is provided by which a vehicle magnetic field is established to interact with the earth's magnetic field to provide a measure of roll and yaw attitude control.

SUMMARY OF THE INVENTION

In view of the above, it is an object of the present invention, among others, to provided an apparatus and method for controlling the attitude of a geosynchronous satellite.

It is another object of the present invention to provide apparatus and method for controlling the attitude of a geosynchronous satellite to correct for roll and yaw pointing errors as a consequence of orbit inclination drift.

It is another object of the present invention to provide apparatus and method for correcting roll and yaw pointing errors in a geosynchronous satellite that effects pointing error control in a fuel-efficient manner.

In view of these objects, and others, the present invention provides a system and method for attitude control in a geosynchronous satellite to compensate for pointing errors consequent to orbit inclination variation from the nominal equatorial orbit plane. A momentum vector is established for the satellite with the momentum vector fixed in inertial space and coupled to the satellite through a gimbal system providing at least a one degree-of-freedom relationship between the vehicle and the momentum vector. The gimbal axis is provided along at least one of the major satellite axes, such as roll and/or yaw axis, with a gimbal torquer provided to torque the satellite about the inertially fixed momentum vector to correct the attitude errors. The roll and yaw errors due to orbit inclination depend on the angular momentum direction and an be determined analytically as a function of orbit inclination and the location of the satellite in its orbit. Depending upon the particular configuration, the gimbal torquer rotates the spacecraft about the roll axis and/or the yaw axis in the proper timed relationships to correct the pointing errors as the satellite revolves about the earth. In addition to the roll and yaw errors introduced by orbit inclination, additional pointing errors introduced by other external disturbance torques, such as a solar torques, are corrected by using a conventional attitude control system consisting of an earth sensor and attitude control torquers.

In a first embodiment of the present invention, a spin-stabilized satellite includes a spun section, which provides an inertially fixed momentum vector, and a despun antenna assembly that is coupled to the spun section through a two degree-of-freedom gimbal set having a first gimbal mounted for rotation about the roll axis and the other gimbal mounted for rotation about the yaw axis. Gimbal torquers are provided to apply a torque to the gimbal associated with the respective roll or yaw axis correction and thus torque the antenna assembly about the inertially fixed momentum vector established by the spun section to correct the roll and yaw pointing errors introduced by orbit inclination. The roll and yaw gimbal torquers are driven in a sinusoidal manner using a 24 hr. period. By utilizing the satellite body as the angular momentum device and effecting selectively controlled coupling to the antenna assembly through the two degree-of-freedom gimbal set, a substantial measure of pointing error correction is provided without the need to expend fuel for orbit inclination correction. While a two degree-of-freedom relationship is preferred, a one degree-of-freedom relationship along at least one of the roll or yaw axes can be provided with effect correction along one of the axes.

In another embodiment of the present invention, a momentum wheel is coupled to the vehicle through a two degree-of-freedom gimbal set with torquers provided along the roll nd yaw axes to effect rotation of the vehicle about the inertially fixed momentum vector. As in the case of the first embodiment, the roll and yaw gimbal torquers are driven in a sinusoidal manner using a 24 hr. period.

In still another embodiment of the present invention, the angular momentum direction is selected such that one of the two errors, either roll or yaw, due to orbit inclination becomes zero. The other error is corrected by providing a single degree-of-freedom gimbal along that axis and rotating the spacecraft to the error, which is accomplished by a combination of torques applied to the gimbal to rotate the vehicle relative to the inertially fixed momentum vector.

The present invention advantageously provides an apparatus and method by which a geosynchronous satellite can readily compensate for roll and yaw pointing errors consequent to orbit inclination drift from the nominal equatorial orbit in a fuel-efficient manner to dramatically extend the operating life of the satellite in comparison with prior systems and methods that depend upon fuel-expending thrusters to correct orbit inclination.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 4:
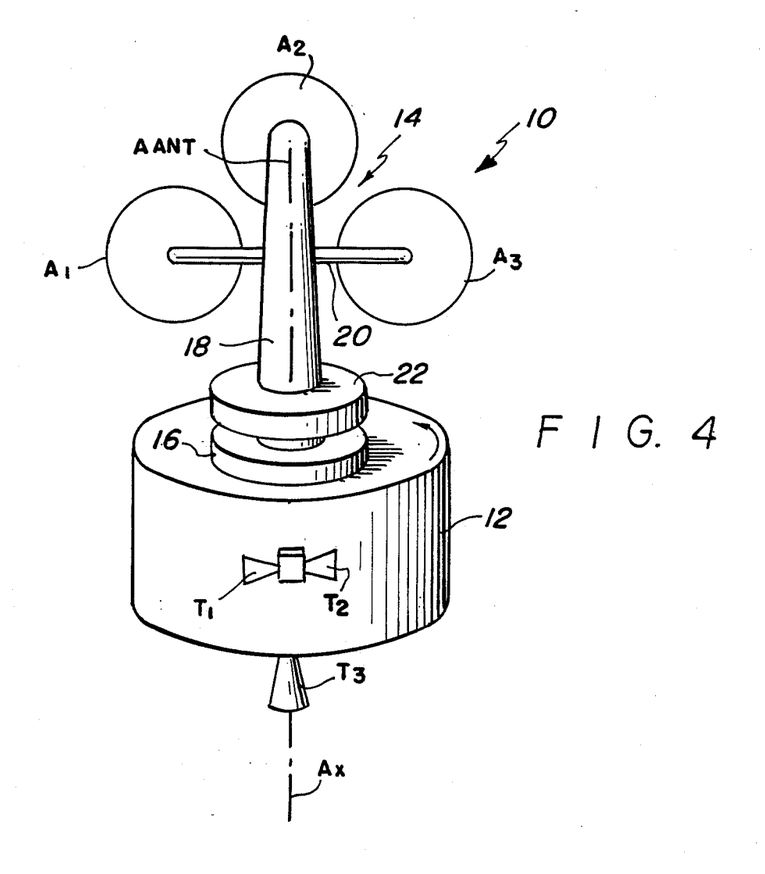
FIG. 4 is a pictorial view, in schematic form, of a first embodiment of the present invention.

A satellite incorporating the present invention is shown in FIG. 4 in pictorial form and is designated therein generally by the reference character 10. The satellite 10 is of the spin stabilized type intended for use in a geosynchronous orbit and includes a spun section 12 and a despun antenna tower 14. The spun section 12 is designed to rotate about the primary vehicle axis $A_x$ and is of conventional design including a generally cylindrical hull, for example, of the Longeron type, and a despin motor and bearing assembly indicated in schematic form at 16. Depending upon its intended mission, the satellite 10 is equipped with appropriate tracking, telemetry, and command systems; primary power systems; thermal control systems; and a propulsion system. As shown in FIG. 4, the satellite 10 includes a thruster control system including first, second, and third thrusters $T_1$, $T_2$, and $T_3$. The thrusters $T_n$ are of conventional design and are operated in response to signal-controlled valves to eject propellant, typically hydrazine, to change the angular momentum of the satellite 10. The thrusters $T_n$ illustrated in FIG. 4 are exemplary only and other thruster $T_n$ organizations are suitable depending upon the satellite configuration.

In addition to the roll and yaw pointing errors introduced by orbit inclination, as discussed above, there may be additional errors introduced by other external disturbance torques, such as solar torques. These additional errors are corrected by using a conventional attitude control system consisting of an earth sensor and attitude control torquers. The output of the earth sensor is provided to attitude controllers, for example, thrusters which then function to correct the satellite attitude errors caused by the external disturbance torques. An exemplary earth sensor system is disclosed, for example, in the afore-mentioned U.S. Pat. No. 4,084,772 to Muhlfelder.

The antenna tower 14, which is also illustrated in exemplary form, includes a mast 18 and a laterally extending spar 20 with antennas $A_1$, $A_2$, and $A_3$ mounted at the ends of the mast 18 and spar 20. Depending upon the vehicle mission the antennas $A_n$ are pointed at one or more terrestrial areas for effecting communications for broad area and/or spot beam coverage. The mast 18 includes structure for conveying microwave energy from output amplifiers (no specifically shown) of the spun section 12 to the antennas $A_n$ and, conversely, conveying received energy to receivers (not shown) within the spun section 12.

Figure 5:
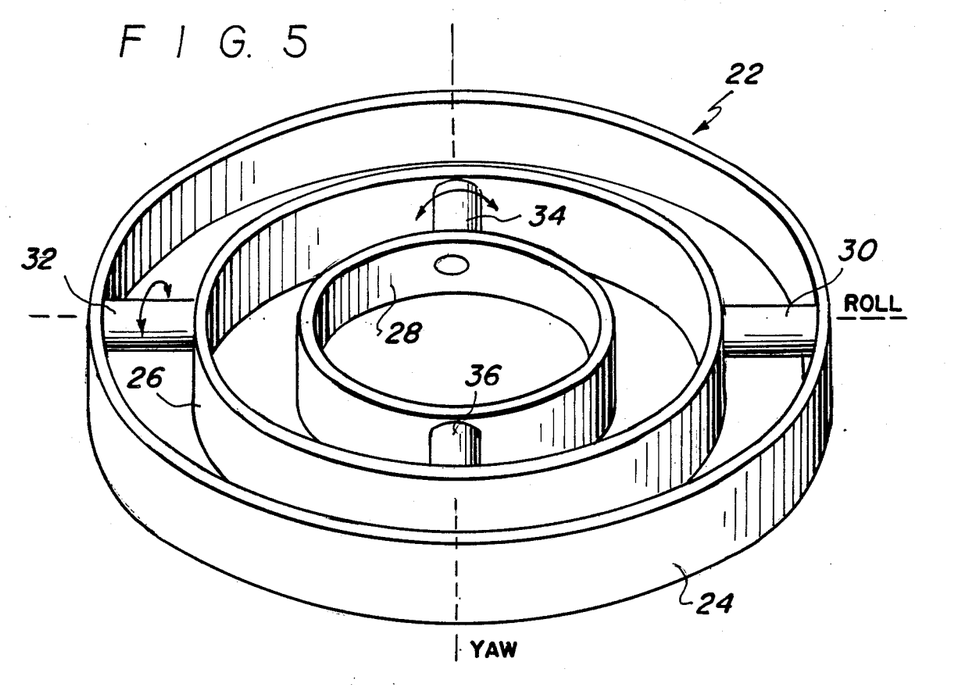
FIG. 5 is an isometric projection of a two degree-of-freedom gimbal set used with the embodiment of FIG. 4.

A gimbal unit 22, shown in schematic form in FIG. 3 and in detail in FIG. 5, is connected between the despin motor and bearing assembly 16 and the antenna tower 14. The gimbal unit 22 allows a selected tilting of the antenna tower 14 relative to the spun section 12 along two axes, viz., the roll and yaw axes. Accordingly, the principal axis of the antenna tower $A_{ant}$ can be controlled, as explained below, to be coincident with the principal axis $A_x$ of the spun section 12 or aligned at an angle relative to the principal axis $A_x$. As shown in FIG. 5, the gimbal unit 22 includes a support ring 24 that is structurally connected to the antenna tower 14, an outer gimbal 26, and an inner gimbal 28 connected to the despin motor and bearing assembly 16 by a suitable structural member, such as a hollow column (not shown). The outer gimbal 26 is coupled to the support ring 24 by an outer gimbal torquer 30 and an outer gimbal position sensor 32 having their respective axes of rotation co-aligned with the roll axis, for example. In a similar manner, the outer gimbal 26 is coupled to the inner gimbal 28 by an inner gimbal torquer 34 and an inner gimbal position sensor 36 having their respective axes of rotation co-aligned along the yaw axis. The gimbal torquers 30 and 34 are of conventional design, for example, an electrically driven motor and gear train for effecting relative rotation of the affected gimbal. The gimbal position sensors 32 and 34 provide output information regarding the relative angular relationship of the gimbals and can include, for example, resolvers or optical encoders to provide the necessary angular position information. Gimbal stops (not shown) are provided to limit the angular displacement of the gimbals to with in acceptable limits.

Figure 6:
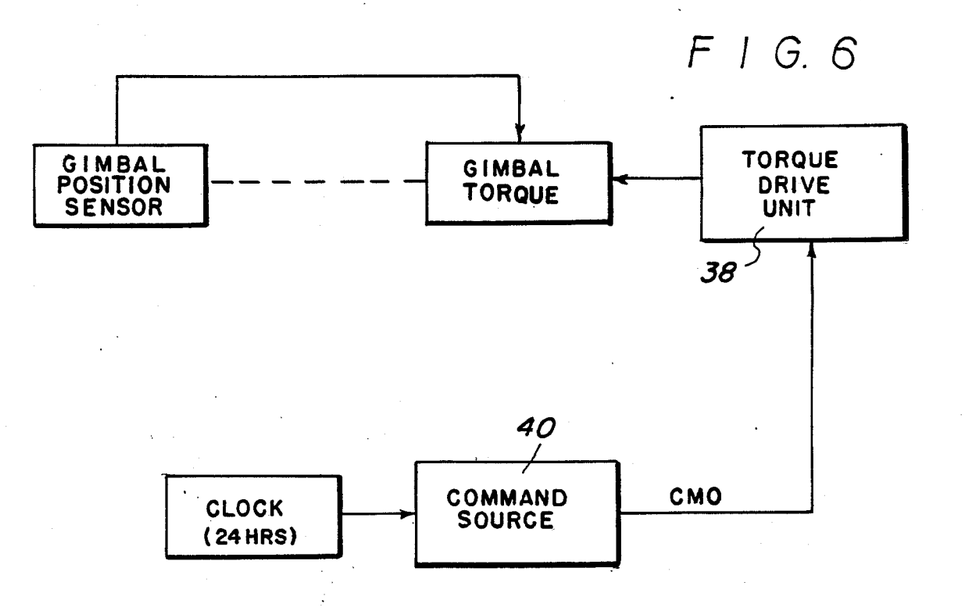
FIG. 6 is a representative control loop, illustrated in schematic block diagram form, for effecting control of a gimbal.

The movement of the gimbals 26 and 28 as well as final positioning is controlled by a gimbal control loop, an exemplary architecture being illustrated in FIG. 6. As shown, a torquer drive unit 38 accepts an input signal 'CMD' from a command source 40 designating a desired position and provides an appropriate electrical output signal to the torquer which, in turn, drives its mechanically connected gimbal (represented in dotted line illustration in FIG. 5), toward its new position. The command source 40 can provide the input signal 'CMD', in part, by command of ground control or from on-board processing. A clock CLK provides a 24 hr. timing signal t with t=0 at the ascending node $N_a$ (FIG. 1). The gimbal control signal thus varies with time in a sinusoidal manner as the satellite revolves about the earth. More specifically, the command signal CMD, as explained more fully below, includes a SIN nt function for roll axis correction and a COS nt function for yaw axis correction. The gimbal position sensor provides an electrical feedback signal to the torquer drive unit 38 indicating the position of the gimbal with the torquer drive unit 38 controlling the torquer to effect movement to the desired position and maintenance of that position.

In order to effect roll and yaw axis correction in the context of the organization of FIG. 4, the satellite spin axis $A_x$ is preferably initially aligned normal to the inclined orbit plane (FIG. 2) of the satellite this inclination also aligning the spin axis Ax at an angle i relative to the equatorial orbit plane normal. The roll axis gimbal torquer 30 is then controlled by a time-varying sinusoidal CMD signal $-\theta$ SIN nt where the maximum value of $\theta$ is (0.178 i) and the yaw axis gimbal torquer 34 is simultaneously controlled by a time-varying sinusoidal CMD signal i COS nt. The value 0.178 is fixed by the geometry of the geosynchronous orbit, that is, the radius of the earth and the altitude of the orbit, and n represents the orbit angular rate. The roll error is biased by $-\theta$ SIN nt by introducing a $-\theta$ SIN nt offset factor into the satellite earth sensor control loop to effect the $-\theta$ SIN nt offset. As can be appreciated, the antenna tower 14 will realign its axis $A_{ant}$ relative to the axis $A_x$ of the spun section 12 to achieve a continuously time-varying correction of the roll and yaw pointing error with each revolution of the satellite 10. While it is preferred that the satellite spin axis $A_x$ be initially aligned normal to the inclined orbit plane of the satellite 10, this alignment is not necessary and other alignments are possible so long as the momentum vector of the spun section 12 remains inertially fixed.

The embodiment of FIG. 4 has been described in the context of a two degree-of-freedom context. If desired, the coupling of the momentum vector provided by the spun section 12 to the antenna tower 14 can be through a single degree-of-freedom connection with the gimbal axis aligned along one or the other of the roll or yaw axes. Thus where the single degree-of-freedom connection is aligned on the yaw axis, an offset factor is introduced in the earth sensor control loop to effect a roll axis pointing correction while the gimbal-controlled axis is rotated in a periodic manner to correct for the yaw axis error.

Figure 7:
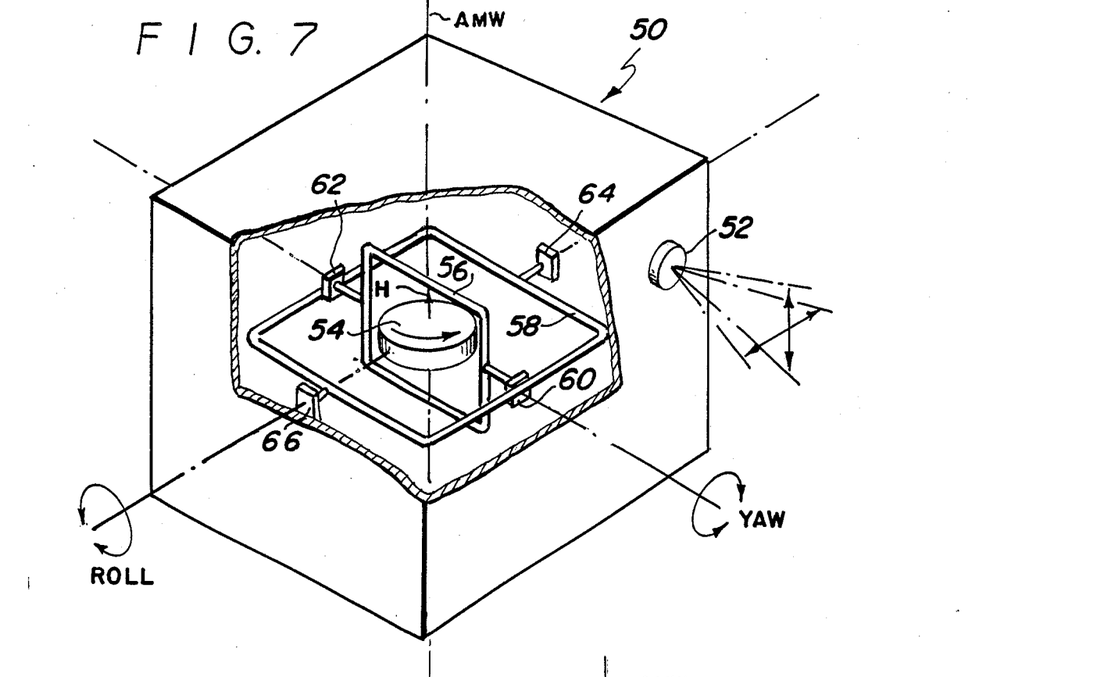
FIG. 7 is a pictorial representation, in schematic form, of a second embodiment of the present invention.

A second embodiment of a satellite incorporating the present invention is illustrated in pictorial form in FIG. 7 and designated generally therein by the reference character 50. As shown, the satellite 00 is formed as a parallelepiped with selected portions broken away to present the interior of the vehicle. For reasons of clarity, associated structure including solar panels, antennas, and thrusters have been omitted from FIG. 7.

The satellite 50 includes an earth sensor 52 which is used in conjunction with conventional torquers to correct attitude errors introduced by external disturbances other than those caused by orbit inclination, these external disturbances including solar torques, for example. As shown, a momentum wheel 54 is mounted for rotation about a momemtum wheel axis $A_{mw}$ and is carried in an inner gimbal 56 and an outer gimbal 58. The inner gimbal 56 is rotatably connected to the outer gimbal by an inner gimbal torquer 60 and an inner gimbal position sensor 62 having their respective axes aligned along the yaw axis. The outer gimbal 58 is rotatably connected to the vehicle frame or structure by an outer gimbal torquer 64 and an outer gimbal position sensor 66 having their respective axes co-aligned with the roll axis.

The momentum wheel 54 is driven by an electric motor (not shown) and develops in momentum vector H in the direction indicated with the momentum vector remaining inertially fixed. Since the sinusoidal relationship between the roll pointing error and the yaw pointing error is known, a sinusoidally varying yaw axis correction signal is determinable from the time-varying roll error correction command and is likewise provided to the inner gimbal torquer 60 to effect rotation of the vehicle about its yaw axis relative to the inertially fixed momentum vector H. As described above in connection with the embodiment of FIG. 5, if the momentum wheel spin axis is normal to the inclined orbit plane, the roll error is biased by $-\theta$ SIN nt with the roll axis gimbal torquer 64 controlled by a time-varying sinusoidal CMD signal $-\theta$ SIN nt where the maximum value of $\theta$ is 0.178$i$ and the yaw axis gimbal torquer 60 is simultaneously controlled by a time-varying sinusoidal CMD signal i COS nt. The commands for roll error bias and gimbal angle control can be provided from ground control or from on-board processing.

The embodiment of FIG. 7, like that of FIG. 5, provides a momentum vector, either by spinning the vehicle itself or by spinning a separate body, and coupling to the momentum vector through a two degree-of-freedom device to allow torquing of the vehicle about its roll and yaw axes to correct for the roll and yaw pointing errors as a consequence of the inclination of the satellite orbit relative to the nominal equatorial plane. In addition to effecting torquing of the satellite about an inertially fixed momentum vector H using a two degree-of-freedom gimbal set as disclosed above, it is also contemplated that pointing error correction can be effected with a single-gimbal momentum wheel in combination with the thruster control system as described below in connection with tee embodiments of FIGS. 8 and 9.

Figure 8:
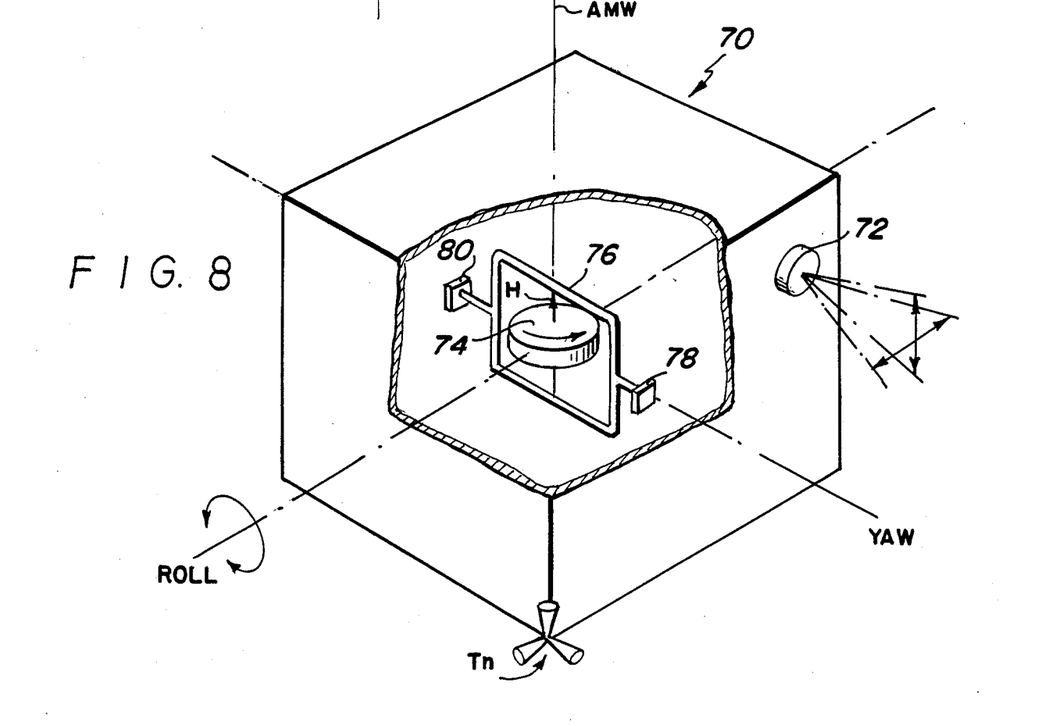
FIG. 8 is a pictorial representation, in schematic form, of a third embodiment of the present invention.

As shown in FIG. 8, a satellite 70 is provided with an earth sensor 72 and a gimballed momentum wheel 74 mounted for rotation about an axis $A_{mw}$ to develop a momentum vector H. The momentum wheel 74 is coupled to the vehicle structure through a single degree-of-freedom gimbal 76. A gimbal torquer 78 and a gimbal position sensor 80 are mounted in a co-linear relationship with the yaw axis. The motion of the gimbal 76 throughout the orbit revolution is controlled a control loop of the type presented in FIG. 6 and includes the programmable gimbal drive unit including a clock capable of precessing the gimbal through a twenty-four hour cycle, as described above in relationship to FIG. 6. The roll axis is biased by $-\theta$ SIN nt where $\theta$ is the tilt angle with a maximum value of 0.178 i where i is the orbit inclination. Roll control is effected by using one or more of the thrusters $T_n$ in the usual manner to tilt the momentum wheel spin axis $A_{mw}$ by an angle $\theta$ from the inclined orbit normal. The spacecraft is then rotated with respect the inertially fixed momentum wheel axis $A_{mw}$ about the yaw axis to an angle (i+$\theta$) COS nt to correct the errors introduced by orbit inclination. The commands for roll error bias and gimbal precession along the yaw axis can be provided from ground control or from the on-board processing.

Figure 9:
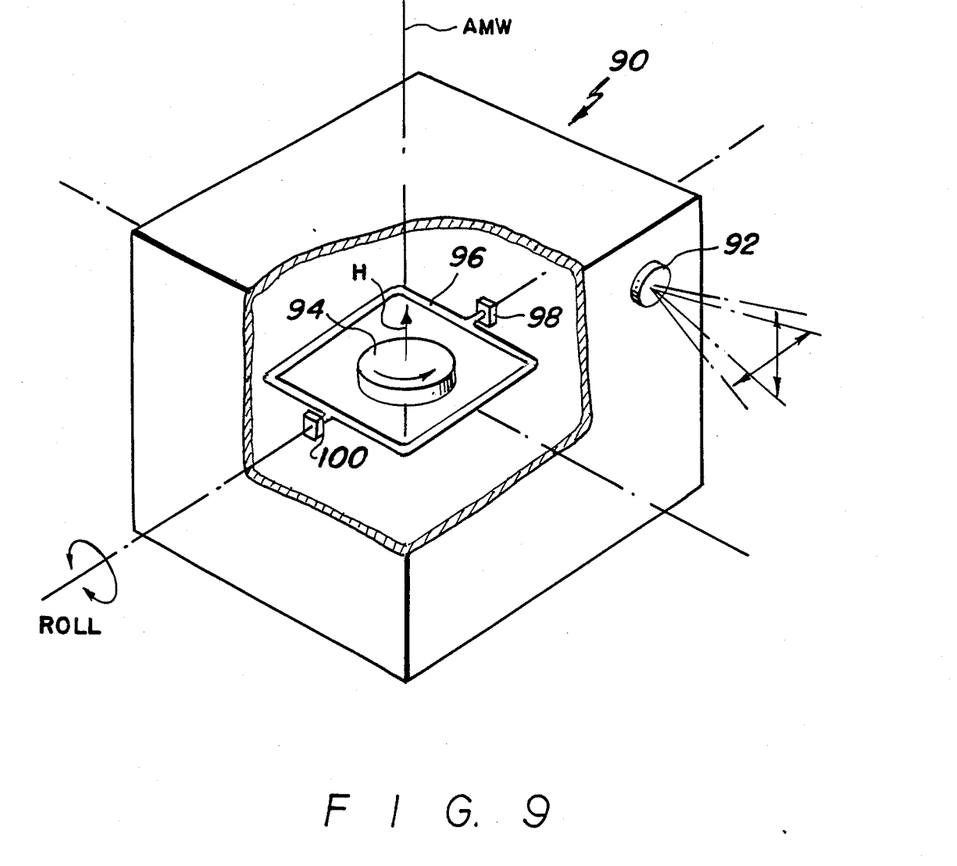
FIG. 9 is a pictorial representation, in schematic form, of a fourth embodiment of the present invention.

Another embodiment of the present invention is illustrated in FIG. 9 and, like the embodiment of FIG. 8, includes a momentum wheel coupled to the vehicle structure through a single degree-of-freedom gimbal. As shown, a satellite 90 includes an earth sensor 92 and a momentum wheel 94 rotatinq about an axis $A_{mw}$ to develop a momentum vector H. The momentum wheel 94 is coupled to the vehicle structure through a single degree-of-freedom gimbal 96. A gimbal torquer 98 and a gimbal position sensor 100 are mounted in a co-linear relationship with the roll axis. The motion of the gimbal 96 throughout the orbit revolution is controlled a control loop of the type presented in FIG. 6 and includes the programmable gimbal drive unit including a clock capable of precessing the gimbal through a twenty-four hour cycle. The spin axis $A_{mw}$ of the momentum wheel 94 is nominally kept along the north/south axis, normal to the equatorial orbit plane. The satellite 90 is rotated with respect to the axis by an angle $-(i+\theta)$ SIN nt where $\theta$ is the tilt angle with a maximum value of 0.178 i and the roll error is biased by a $-\theta$ SIN nt offset value. The command for the roll error bias and the roll axis gimbal angles are provided from ground control or from on-board processing. The magnitude of the roll error bias and the roll axis gimbal angle are updated periodically by ground control to take into account he change in orbit inclination.

The present invention advantageously provides system and method for controlling à geosynchronous satellite to continuously correct for pointing errors caused by orbit inclination drift relative to the nominal equatorial plane in a fuel-efficient manner. The present invention thus allows for greatly increased service life for geosynchronous satellites because of a significant reduction in satellite station-keeping fuel requirements.

Thus it will be appreciated from the above that as a result of the present invention, an effective attitude pointing error correction system and method for geosynchronous satellites is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A method of correcting pointing errors in a geosynchronous satellite consequent to orbit inclination, comprising the steps of:

establishing the momentum vector along an axis other than an axis normal to the equatorial orbit plane;

coupling the momentum vector to the satellite through at least a single degree-of-freedom connection coincident with at least a selected one of the roll or yaw axes for effecting rotation of the satellite relative to the momentum vector about the selected axis, the roll axis tangential to the orbit path and the yaw axis perpendicular to the roll axis in the orbit plane; and torquing the satellite about the selected axis in a time-varying manner in synchronism with the orbit of the satellite and as a function of an orbit inclination angle i.

2. The method of claim 1, wherein said coupling step further comprises:

coupling the momentum vector to the satellite through at least a single degree-of-freedom connection coincident with the roll axis for effecting rotation of the satellite relative to the momentum vector about the roll axis.

3. The method of claim 2, wherein said torquing step further comprises:

torquing the satellite about the roll axis as a function of $-\theta \sin nt$ where $t$=time with $t$=0 at the ascending node, $n$=the orbit angular rate, and $\theta$ has a maximum value of $0.178i$.

4. The method of claim 1, wherein said coupling step further comprises:

coupling the momentum vector to the satellite through at least a single degree-of-freedom connection coincident with the yaw axis for effecting rotation of the satellite relative to the momentum vector about the yaw axis.

5. The method of claim 4, wherein said torquing step further comprises:

torquing the satellite about said yaw axis as a function of $i \cos nt$ where $t$=time with $t$=0 at the ascending node and $n$=the orbit angular rate.

6. The method of claim 5, wherein said torquing step further comprises:

establishing the momentum vector along an axis tilted by an angle $\theta$ from the inclined orbit normal; and torquing the satellite about said yaw axis by $(i+\theta) \cos nt$ where $t$=time with $t$=0 at the ascending node and $n$=the orbit angular rate, $\theta$ has a maximum value of $0.178i$.

7. The method of claim 1, wherein said coupling step further comprises:

coupling the momentum vector to the satellite through a two degree-of-freedom connection coincident, respectively, with the roll and yaw axes for effecting rotation of the satellite relative to the momentum vector about the roll and yaw axes.

8. The method of claim 7, wherein said torquing step further comprises:

torquing the satellite about the roll axis as a function of $-\theta \sin nt$ and about said yaw axis as a function of $i \cos nt$ where $t$=time with $t$=0 at the ascending node, $n$=the orbit angular rate, and $\theta$ has a maximum value of $0.178i$.

9. The method of claim 8, wherein said torquing step further comprises:

establishing the momentum vector along a normal to the inclined orbit plane; and torquing the satellite about the roll axis by $-\theta \sin nt$ and about said yaw axis by $i \cos nt$ where $t$=time with $t$=0 at the ascending node, $n$=the orbit angular rate, and $\theta$ has a maximum value of $0.178i$.

10. A method of correcting pointing errors in a geosynchronous satellite consequent to orbit inclination, the satellite of the type having a spun section that establishes a momentum vector along an axis and a despun section, comprising the steps of:

establishing a momentum vector along an axis other than an axis normal to the equatorial orbit plane;

coupling the momentum vector of the spun section to the despun section through at least a single degree-of-freedom connection coincident with at least a selected one of the roll or yaw axes for effecting rotation of the despun section relative to the momentum vector about the selected axis, the roll axis tangential to the orbit path and the yaw axis perpendicular to the roll axis in the orbit plane; and torquing the despun section about the selected axis in a time-varying manner in synchronism with the orbit of the satellite and as a function of an orbit inclination angle i.

11. The method of claim 10, wherein said coupling step further comprises:

coupling the momentum vector of the spun section to the despun section through at least a single degree-of-freedom connection coincident with the roll axis for effecting rotation of the despun section relative to the momentum vector about the roll axis.

12. The method of claim 11, wherein said torquing step further comprises:

torquing the despun section about the roll axis as a function of $-\theta \sin nt$ where $t$=time with $t$=0 at the ascending node, $n$=the orbit angular rate and $\theta$ has a maximum value of $0.178i$.

13. The method of claim 10, wherein said coupling step further comprises:

coupling the momentum vector of the spun section to the despun section through at least a single degree-of-freedom connection coincident with the yaw axis for effecting rotation of the despun section relative to the momentum vector about the yaw axis.

14. The method of claim 13, wherein said torquing step further comprises:

torquing the despun section about the yaw axis as a function of $i \cos nt$ where $t$=time with $t$=0 at the ascending node and $n$=the orbit angular rate.

15. The method of claim 14, wherein said torquing step further comprises:

establishing the momentum vector along an axis tilted by an angle $\theta$ from the inclined orbit normal; and torquing the satellite about said yaw axis by $(i+\theta) \cos nt$ where $t$=time with $t$=0 at the ascending node and $n$=the orbit angular rate, and $\theta$ has a maximum value of $0.178i$.

16. The method of claim 10, wherein said coupling step further comprises:

coupling the mometum vector of the spun section to the despun section through a two degree-of-freedom connection coincident, respectively, with the roll and yaw axes for effecting rotation of the despun section relative to the momentum vector about the roll and yaw axes.

17. The method of claim 16, wherein said torquing step further comprises:

torquing the satellite about the roll axis as a function of $-\theta$ SIN nt and about said yaw axis as a function of i COS nt where t=time with t=0 at the ascending node, n=the orbit angular rate, and $\theta$ has a maximum value of $0.178i$.

18. The method of claim 17, wherein said torquing step further comprises:
   establishing the momentum vector along a normal to the inclined orbit plane; and
   torquing the satellite about the roll axis by $-\theta$ SIN nt and about said yaw axis by i COS nt where t=time with t=0 at the ascending node, n=the orbit angular rate, and $\theta$ has a maximum value of $0.178i$.

19. A method of correcting pointing errors in a geosynchronous satellite consequent to orbit inclination, comprising the steps of:
   rotating at least one mass about an axis to establish a momentum vector along the axis, the axis other than an axis normal to the equatorial orbit plane;
   coupling the momentum vector to the satellite through at least a single degree-of-freedom connection coincident with at least a selected one of the roll or yaw axes for effecting rotation of the satellite relative to the momentum vector about the selected axis, the roll axis tangential to the orbit path and the yaw axis perpendicular to the roll axis in the orbit plane; and
   torquing the satellite about the selected axis in a time-varying manner in synchronism with the orbit of the satellite and as a function of an orbit inclination angle i.

20. The method of claim 19, wherein said coupling step further comprises:
   coupling the momentum vector to the satellite through at least a single degree-of-freedom connection coincident with the roll axis for effecting rotation of the satellite relative to the momentum vector about the roll axis.

21. The method of claim 20, wherein said torquing step further comprises:
   torquing the satellite about the roll axis as a function of $-\theta$ SIN nt where t=time with t=0 at the ascending node, n=the orbit angular rate, and $\theta$ has a maximum value of $0.178i$.

22. The method of claim 19, wherein said coupling step further comprises:
   coupling the momentum vector to the satellite through at least a single degree-of-freedom connection coincident with the yaw axis for effecting rotation of the satellite relative to the momentum vector about the yaw axis.

23. The method of claim 22, wherein said torquing step further comprises:
   torquing the satellite about the yaw axis as a function of i COS nt where t=time with t=0 at the ascending node and n=the orbit angular rate.

24. The method of claim 23, wherein said torquing step further comprises:
   establishing the momentum vector along an axis tilted by an angle $\theta$ from the inclined orbit normal; and
   torquing the satellite about said yaw axis y $(i+\theta)$ COS nt where t=time with t=0 at the ascending node and n=the orbit angular rate, $\theta$ has a maximum value of $0.178i$.

25. The method of claim 19, wherein said coupling step further comprises:
   coupling the momentum vector to the satellite through a two degree-of-freedom connection coincident, respectively, with the roll and yaw axes for effecting rotation of the satellite relative to the momentum vector about the roll and yaw axes.

26. The method of claim 25, wherein said torquing step further comprises:
   torquing the satellite about the roll axis as a function of $\theta$ SIN nt and about said yaw axis as a function of i COS nt where t=time with t=0 at the ascending node, n=the orbit angular rate, and $\theta$ has a maximum value of $0.178i$.

27. The method of claim 26, wherein said torquing step further comprises:
   establishing the momentum vector along a normal to the inclined orbit plane; and
   torquing the satellite about the roll axis by $-\theta$ SIN nt and about said yaw axis by i COS nt where t=time with t=0 at the ascending node, n=the orbit angular rate, and $\theta$ has a maximum value of $0.178i$.

28. The method of claim 19, wherein the geosynchronous satellite is of the type having an earth sensor control loop for determining the attitude of the satellite relative to the earth and for correcting the attitude in response to the output of the earth sensor, further comprising the step of:
   introducing a bias value into the earth sensor control loop to offset the effect of the torquing step.

29. An attitude control system for a geosynchronous satellite, comprising:
   means for establishing a momentum vector by rotation of a mass about a spin axis, the axis other than an axis normal to the equatorial orbit plane;
   means for coupling the momentum vector to at least a portion of the geosynchronous satellite for controlled relative rotation of the satellite about at least a selected one of the roll axis or yaw axis, the roll axis tangential to the orbit path and the yaw axis perpendicular to the roll axis in the orbit plane; and
   means for driving said coupling means to effect controlled rotation of said satellite about the selected axis in a time-varying manner in synchronism with the orbit of the satellite and as a function of the orbit inclination angle i.

30. The attitude control system for a geosynchronous satellite of claim 29, wherein said first-mentioned means comprises a momentum wheel mounted for rotation about a spin axis to develop a momentum vector therealong.

31. The attitude control system for a geosynchronous satellite of claim 29, wherein said first-mentioned means comprises a first portion of the satellite mounted for rotation about a spin axis relative to another despun portion of the satellite.

32. The attitude control system for a geosynchronous satellite of claim 29, wherein said second-mentioned means comprises a single degree-of-freedom gimbal means having an axis coincident with the roll axis for effecting rotation of the satellite relative to the momentum vector about the roll axis.

33. The attitude control system for a geosynchronous satellite of claim 32, wherein said gimbal means is controlled by said third-mentioned means as a function of $-\theta$ SIN nt where t=time with t=0 at the ascending node, n=the orbit angular rate, and $\theta$ has a maximum value of $0.187i$.

34. The attitude control system for a geosynchronous satellite of claim 29, wherein said second-mentioned means comprises a single degree-of-freedom gimbal means having an axis coincident with the yaw axis for effecting rotation of the satellite relative to the momentum vector about the yaw axis.

35. The attitude control system for a geosynchronous satellite of claim 34, wherein said gimbal means is controlled by said third-mentioned means as a function of i COS nt where t=time with t=0 at the ascending node, n=the orbit angular rate, and i=the orbit inclination angle.

36. The attitude control system for a geosynchronous satellite of claim 35, wherein said first-mentioned means establishes the momentum vector along an axis tilted by an angle $\theta$ from the inclined-orbit plane normal and said gimbal means is controlled by said third-mentioned means by (i+$\theta$) COS nt where t=time with t=0 at the ascending node, n=the orbit angular rate, and i=the orbit inclination angle.

37. The attitude control system for a geosynchronous satellite of claim 29, wherein said second-mentioned means comprises a two degree-of-freedom gimbal means having axes coincident with the roll and yaw axes of the satellite.

38. The attitude control system for a geosynchronous satellite of claim 37, wherein the roll axis is controlled by said third-mentioned means as a function of $-\theta$ SIN nt where t=time with t=0 at the ascending node, n=the orbit angular rate and $\theta$ has a maximum value of 0.178i.

39. The attitude control system for a geosynchronous satellite of claim 38, wherein said first-mentioned means establishes the momentum vector along a normal to the inclined orbit plane and the roll axis is controlled by said third-mentioned means by $-(i+\theta)$ SIN nt where t=time with t=0 at the ascending node, n=the orbit angular rate, and $\theta$ has a maximum value of 0.178i.

40. The attitude control system for a geosynchronous satellite of claim 37, wherein the yaw axis is controlled by said third-mentioned means as a function of i COS nt where t=time with t=0 at the ascending node, n=the orbit angular rate, and i=the orbit inclination angle.

41. The attitude control system for a geosynchronous satellite of claim 40, wherein said first-mentioned means establishes the momentum vector along a normal to the inclined orbit plane and the yaw axis is controlled by said third-mentioned means by i COS nt where t=time with t=0 at the ascending node, n=the orbit angular rate, and i=the orbit inclination angle.

42. The attitude control system for a geosynchronous satellite of claim 37, wherein the roll axis is controlled by said third-mentioned means as a function of $-\theta$ SIN nt and the yaw axis is controlled by said third-mentioned means as a function of i COS nt where t=time with t=0 at the ascending node, n=the orbit angular rate, i=the orbit inclination angle, and $\theta$ has a maximum value of ratio of the earth's radius to the geosynchronous orbit altitude multiplied by the orbit inclination angle.

43. An attitude control system for a geosynchronous satellite of the type having a spun section that establishes a momentum vector and a despun section, comprising:
   means defining a two degree of freedom coupling between the spun and despun sections for controlled relative rotation of the spun and depsun sections of the satellite about orthogonal roll and yaw axes defined by the two degrees of freedom coupling, the roll axis tangential to the orbit path and the yaw axis perpendicular to the roll axis in the orbit plane; and
   means for controlling said coupling means to effect controlled relative rotation between said spun and despun sections in a time-varying manner in synchronism with the orbit of the satellite about the earth and as a function of the orbit inclination angle i.

44. The attitude control system of claim 43, wherein the momentum vector is established along an axis other than an axis normal to the equatorial orbit plane.

45. The attitude control system of claim 44, wherein said second-mentioned means controls said coupling means to provide relative rotation about said roll axis as a function of $-\theta$ SIN nt and relative rotation about said yaw axis as a function of i COS nut where t=time with t=0 at the ascending node, n=the orbit angular rate, i=the orbit inclination angle, and $\theta$ having a maximum value of the ratio of the earth's radius to the geosynchronous orbit altitude multiplied by the orbit inclination angle.

46. The attitude control system of claim 44, wherein said second-mentioned means controls said coupling means to provide relative rotation about said roll axis as a function of $-\theta$ SIN nt, where t=time with t=0 at the ascending node, n=the orbit angular rate, i=the orbit inclination angle, and $\theta$ has a maximum value of 0.178i.

47. The attitude control system of claim 44 wherein said second-mentioned means controls said coupling means to provide relative rotation about said yaw axis as a function of i COS nt with t=time with t=0 at the ascending node, n=the orbit angular rate, i=the orbit inclination angle.

* * * * *

UNITED STATES PATENT AND TRADEMARK OFFICE
CERTIFICATE OF CORRECTION

PATENT NO. : 4,911,385
DATED : March 27, 1990
INVENTOR(S) : AGRAWAL, Brij, et al.

It is certified that error appears in the above-identified patent and that said Letters Patent is hereby corrected as shown below:

On the Title page, above the line "[21] Appl. No.: 44,327"
insert the following three lines:

[73]    Assignee:    INTERNATIONAL TELECOMMUNICATIONS SATELLITE ORGANIZATION,
Washington, D.C.

Col. 2, Line 36.    Delete "tee" and insert --the--.
Col. 3, Line  4.    Delete "provided" and insert --provide--.
Col. 3, Line 31.    Delete "an" and insert --can--.
Col. 3, Line 40.    Delete "a".
Col. 3, Line 66.    Delete "effect" and insert --effective--.
Col. 4, Line  2.    Delete "nd" and insert --and--.
Col. 5, Line 45.    Delete "FIG. 3" and insert --FIG. 4--.
Col. 7, Line  6.    Delete "00" and insert --50--.
Col. 11, Line 61.   Delete "axis y" and insert --axis by--.
Col. 14, Line 33.   Delete "nut" and insert --nt--.

Signed and Sealed this

Fifteenth Day of October, 1991

*Attest:*

HARRY F. MANBECK, JR.

*Attesting Officer*    *Commissioner of Patents and Trademarks*